(12) United States Patent
Kim et al.

(10) Patent No.: US 9,527,990 B2
(45) Date of Patent: Dec. 27, 2016

(54) POLYPROPYLENE RESIN COMPOSITION HAVING IMPROVED MECHANICAL PROPERTIES

(71) Applicant: Hyundai Motor Company, Seoul (KR)

(72) Inventors: Hak Soo Kim, Seoul (KR); Nam Kyoung Kim, Gyeonggi-do (KR); Dae Sik Kim, Yongin (KR); Im Taek Sung, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 166 days.

(21) Appl. No.: 14/136,586

(22) Filed: Dec. 20, 2013

(65) Prior Publication Data

US 2015/0073076 A1    Mar. 12, 2015

(30) Foreign Application Priority Data

Sep. 12, 2013 (KR) .................. 10-2013-0109986

(51) Int. Cl.
*C08L 23/16* (2006.01)
*C08L 23/12* (2006.01)
*C08L 23/10* (2006.01)

(52) U.S. Cl.
CPC .............. *C08L 23/16* (2013.01); *C08L 23/10* (2013.01); *C08L 23/12* (2013.01)

(58) Field of Classification Search
CPC ................................ C08L 23/16; C08L 23/12
USPC ........................................................ 524/232
See application file for complete search history.

(56) References Cited

U.S. PATENT DOCUMENTS 5,965,654 A    10/1999  Hirata et al.
2010/0240818 A1*  9/2010  Walton .................. C08L 23/06
                                                      524/505

FOREIGN PATENT DOCUMENTS

| EP | 0437096 A2 | 7/1991 |
|---|---|---|
| KR | 20010008487 A * | 2/2001 |
| KR | 1020010008487 | 2/2001 |
| KR | 10-2006-0104110 | 10/2006 |
| KR | 10-2007-0017872 A | 2/2007 |
| KR | 10-2007-0098844 A | 10/2007 |
| KR | 1020070098279 | 10/2007 |
| KR | 10-2008-00691077 | 7/2008 |
| KR | 10-0857185 A | 9/2008 |
| KR | 10-2009-0022835 | 3/2009 |
| KR | 10-2010-0133765 A | 12/2010 |
| KR | 20100133765 A * | 12/2010 |
| KR | 20110076341 A * | 7/2011 |
| KR | 1020110076341 | 7/2011 |
| KR | 10-1224331 A | 1/2013 |

OTHER PUBLICATIONS

KR 10-2010-0133765A—machine translation—published Dec. 22, 2010.*
KR 10-2011-0076341A—machine translation—published Jul. 6, 2011.*
KR 10-2001-0008487A—machine translation—published Feb. 5, 2001.*

* cited by examiner

*Primary Examiner* — Ling Choi
*Assistant Examiner* — Ronald Grinsted
(74) *Attorney, Agent, or Firm* — Mintz Levin Cohn Ferris Glovsky and Popeo, P.C.; Peter F. Corless

(57) ABSTRACT

Disclosed is a polypropylene resin composition having superior mechanical properties. More particularly, the polypropylene resin composition includes glass fiber and talc as fillers under an optimized condition and includes an ethylene-butene elastomer. The polypropylene resin composition exhibits no cracking, even when exposed to aromatic compounds or various chemicals, because of its superior chemical resistance, is easily processable because of its excellent mechanical properties such as impact strength, rigidity, etc., and is useful for use in automotive interior parts because of its superior scratch resistance, molding shrinkage, etc.

5 Claims, 1 Drawing Sheet

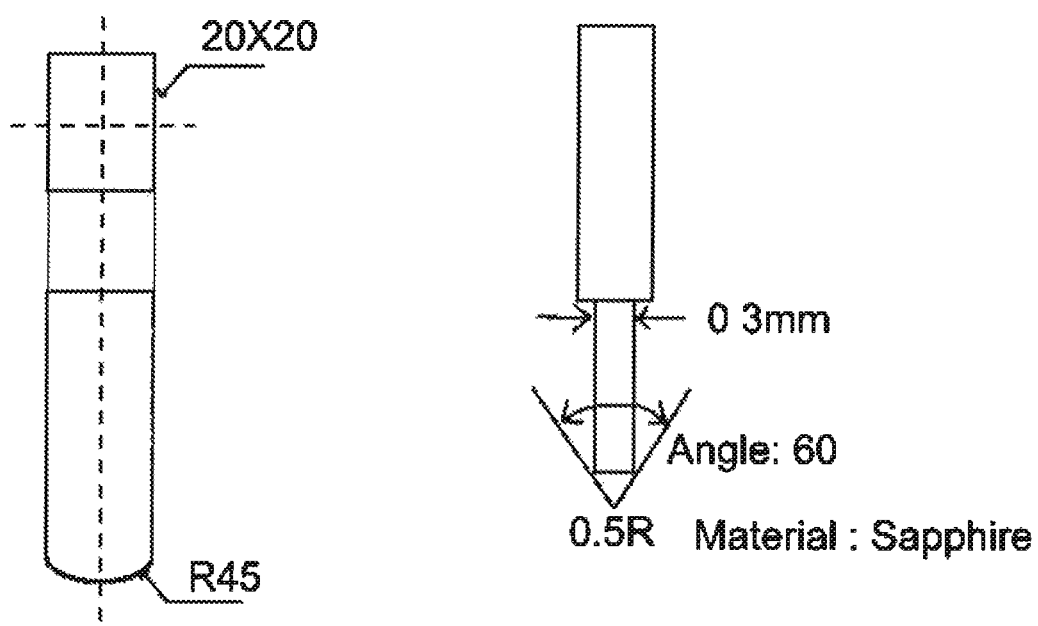

POLYPROPYLENE RESIN COMPOSITION HAVING IMPROVED MECHANICAL PROPERTIES

CROSS-REFERENCE TO RELATED APPLICATIONS

This application claims priority under 35 U.S.C. §119 to Korean Patent Application No. 10-2013-0109986, filed on Sep. 12, 2013, in the Korean Intellectual Property Office, the disclosure of which is incorporated herein by reference in its entirety.

BACKGROUND (a) Technical Field

The present invention relates to a polypropylene resin composition having superior mechanical properties. More particularly, the present invention relates to a polypropylene resin composition, which exhibits no cracking even when exposed to aromatic compounds or various other chemicals because of its superior chemical resistance, is easily processable because of its excellent mechanical properties such as impact strength, rigidity, etc., and is useful for use in automotive interior parts because of its superior scratch resistance, molding shrinkage, etc.

(b) Background Art

Among various resin compositions, acrylonitrile butadiene styrene (ABS) resin is mainly used in various electric/electronic products, automotive interior parts, etc. The ABS resin is an amorphous, milky-white, semi-transparent plastic material formed by copolymerizing acrylonitrile (AN), butadiene and styrene. The ABS resin is also widely used for household goods, office equipment, electronic products and automotive surface parts because it is easily colored, has good surface gloss and superior mechanical properties, such as impact resistance, rigidity and scratch resistance.

However, when the ABS resin is used in indoor household goods or automotive interior parts, cracks and breakage tend to occur upon exposure to aromatic compounds and various chemicals. This is because the amorphous resin has weak chemical resistance.

A polyolefin-based thermoplastic resin, particularly a polypropylene resin, is thus often used as an alternative in these situations.

However, since the polypropylene resin is semicrystalline and has no polar or reactive group, it cannot form a strong polar bond or a hydrogen bond with polar molecules present in an interior part and, as a result, coloring becomes difficult. In addition, the polypropylene resin tends to have poor scratch resistance as impact strength is enhanced. Polypropylene resin further exhibits a higher molding shrinkage than the ABS resin, and thus a special mold is necessary when using the polypropylene resin.

As an existing polypropylene resin composition, Korean Patent No. 857,185 describes a resin composition including 50-95 parts by weight of a polypropylene resin, 5-40 parts by weight of an inorganic fiber, 0-15 parts by weight of an inorganic filler, 0-15 parts by weight of a thermoplastic rubber elastomer and a compatibilizer. The patent describes use of glass fiber as the inorganic fiber and use of talc, etc. as the filler.

U.S. Pat. No. 5,965,654 describes a resin composition and an automotive molded article including 53-68 parts by weight of a block copolymer containing a polypropylene section and a propylene-ethylene random copolymer section, 22-30 parts by weight of talc and 12-20 parts by weight of ethylene-1-butene copolymer rubber, and further including additional components such as glass fiber.

Korean Patent Application Publication No. 2006-104110 describes a polypropylene resin composition including 40-65 wt % of an ultrahigh crystalline olefin-based resin having an isotactic pentad fraction of 96% or more, 2-5 wt % of glass fiber, 5-30 wt % of talc, 5-25 wt % of a polyolefin-based elastomer and 2-4 wt % of an aluminum pigment.

European Patent No. 437,096 describes a resin composition including 45-88 wt % of a crystalline ethylene-propylene copolymer, 2-25 wt % of an inorganic filler and 10-35 wt % of a thermoplastic elastomer (ethylene-butene rubber). Korean Patent No. 804,823 describes a thermoplastic resin composition including 1-90 wt % of a polypropylene resin, 3-50 wt % of a thermoplastic elastomer, 5-50 wt % of an inorganic filler and 0.1-10 wt % of a deodorizing agent having a porous nanoball structure.

However, since these existing polypropylene resin compositions are used in applications where only mechanical rigidity is required, they are limited in providing a high quality appearance or scratch resistance as well as general physical properties or dimensional stability that is required for, e.g., automotive interior parts requiring a high quality appearance.

For these reasons, improvements in the coloring property, scratch resistance and molding shrinkage, as well as chemical resistance, impact resistance, rigidity, etc. of a polypropylene resin is necessary when such a resin is used as a material in various electric/electronic products, indoor goods and automotive interior parts.

Throughout the specification, a number of publications and patent documents are referred to and cited. The disclosure of the cited publications and patent documents is incorporated herein by reference in its entirety to more clearly describe the state of the related art and the present invention.

SUMMARY

The present invention provides, as an alternative to the existing ABS resin, a polypropylene resin composition including glass fiber and talc as fillers under an optimized condition, and further including an ethylene-butene elastomer. The polypropylene resin of the present invention is superior in both mechanical and appearance properties.

According to one aspect, the present invention provides a polypropylene resin composition having superior appearance and mechanical properties.

According to various embodiments, the polypropylene resin composition includes: about 40-70 parts by weight of a base resin selected from a group consisting of polypropylene, a propylene-ethylene copolymer and a mixture thereof; about 10-20 parts by weight of glass fiber; about 2-10 parts by weight of talc; about 10-20 parts by weight of an ethylene-butene elastomer; and about 1-3 parts by weight of a slip agent. According to a preferred embodiment, the slip agent is a mixture of a siloxane-based compound and an amide-based compound.

According to another aspect, the present invention provides an automotive interior part including the polypropylene resin composition having superior appearance and mechanical properties.

The polypropylene resin composition according to the present invention exhibits no cracking even when exposed to aromatic compounds or various chemicals because of superior chemical resistance. The composition is also easily processed because of well-balanced superior mechanical properties, such as impact strength, rigidity, etc., and exhibits superior scratch resistance and molding shrinkage. Owing to the superior properties described above, the polypropylene resin composition according to the present invention is very useful for various automotive interior parts, including for example, cup holders, door garnishes, air vents, front trays, LC trays, console parts, glass fascia, knobs, etc.

Other features and aspects of the present invention will be apparent from the following detailed description, drawings and claims.

BRIEF DESCRIPTION OF THE DRAWING

The above and other objects, features and advantages of the present invention will now be described in detail with reference to certain exemplary embodiments thereof illustrated in the accompanying drawing which is given hereinbelow by way of illustration only, and thus is not limitative of the invention, and wherein:

FIG. 1 schematically shows a sapphire scratch tester used to test scratch resistance in the Test Example.

It should be understood that the appended drawings are not necessarily to scale, presenting a somewhat simplified representation of various preferred features illustrative of the basic principles of the invention. The specific design features of the invention as disclosed herein, including, for example, specific dimensions, orientations, locations and shapes, will be determined in part by the particular intended application and use environment.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, the present invention will be explained in detail with reference to Tables and the accompanying drawings.

A polypropylene resin composition of the present invention generally includes a base resin, glass fiber, talc, and an ethylene-butene elastomer. The composition preferably further includes a mixture of a siloxane-based compound and an amide-based compound in addition thereto. According to various embodiments, the base resin is selected from the group consisting of polypropylene, a propylene-ethylene copolymer and a mixture thereof, and the talk is in plate form.

Hereinafter, the components of the polypropylene resin composition of the present invention are described in further detail.

The base resin is the base material of the polypropylene resin composition of the present invention. Specifically, a high-fluidity crystalline polypropylene or propylene-ethylene copolymer having an isotactic index of about 97% or higher, specifically about 98-99.5%, is preferably used.

In particular, the propylene-ethylene copolymer may have an ethylene content of about 2-14 wt % based on total weight of the propylene-ethylene copolymer. If the ethylene content of the propylene-ethylene copolymer is smaller than 2 wt %, impact property (toughness) may be unsatisfactory. In contrast, if the ethylene content exceeds 14 wt %, rigidity (stiffness) may not be sufficient to for the composition to be used as a material for, e.g., automotive interior parts.

According to various embodiments, the polypropylene has a melt index of about 10-60 g/10 min at 230° C. If the melt index is lower than 10 g/10 min, a molding property of the composition may be unsatisfactory. In contrast, if the melt index exceeds 60 g/10 min, the mechanical strength of the polypropylene resin (e.g., impact strength, rigidity, etc.) may be insufficient for it to be used as a material for automotive interior parts.

According to various embodiments, the base resin is included in an amount of about 40-70 parts by weight based on the total weight of the polypropylene resin composition. If the content of the base resin is less than 40 parts by weight or exceeds 70 parts by weight, impact resistance and rigidity may be unsatisfactory.

According to various embodiments, the glass fiber has an average length of about 3-10 mm and an average diameter of about 4-20 nm.

If the average length of the glass fiber exceeds 10 mm, a surface property provided by the composition may be unsatisfactory because the glass fiber is exposed on the surface and the difference in shrinkage in the flow direction and the vertical direction may increase. In contrast, if the average length is smaller than 3 mm, rigidity may be unsatisfactory.

If the average diameter of the glass fiber exceeds 20 μm, rigidity may be unsatisfactory. In contrast, if it is smaller than 4 μm, while rigidity is improved because of a resulting increased aspect ratio of the glass fiber, it becomes difficult to uniformly disperse the glass fiber in the polypropylene resin.

According to various embodiments, the glass fiber is included in an amount of about 10-20 parts by weight based on 100 parts by weight of the base resin. If the content of the glass fiber is less than 10 parts by weight, impact strength, rigidity and impact resistance may be unsatisfactory. In contrast, if the content exceeds 20 parts by weight, the weight of the resin composition increases because of increased specific gravity and the surface of an article to which the resin composition is applied may become very unstable.

According to various embodiments, the talc used together with the glass fiber has an average particle size of about 10 μm or smaller, specifically about 2-10 μm. If the average particle size of the talc exceeds 10 μm, rigidity, impact property and mechanical property may be unsatisfactory. According to a preferred embodiment, the talc is in plate form.

According to various embodiments, the talc is included in an amount of about 2-10 parts by weight based on 100 parts by weight of the base resin.

If the content of the talc is less than 2 parts by weight, the difference in shrinkage in the flow direction and the vertical direction may not be decreased as desired. In contrast, if the content exceeds 10 parts by weight, mechanical properties may be very unsatisfactory.

According to various embodiments, the glass fiber and the talc are used together as inorganic fillers. Specifically, based on 100 wt % of the inorganic filler including the glass fiber and the talc, the glass fiber may be included in an amount of about 60-80 wt % and the talc in plate form may be included in an amount of about 20-40 wt %. More specifically, the glass fiber may be included in an amount of about 2-3 times more than the talc in plate form.

When the glass fiber and the talc in plate form are included in the resin composition at the above-described mixing ratio, the resin composition may exhibit proper average shrinkage. Also, the difference in shrinkage in the flow direction and the vertical direction may be minimized, and rigidity and impact property may be adequately controlled.

In contrast, if the content of the glass fiber included in the inorganic filler is in excess of the above mixing ratio, the difference in shrinkage in the flow direction and the vertical direction may decrease. In contrast, if the content of the talc is in excess of the above mixing ratio, average shrinkage may increase and strength may decrease.

By including the ethylene-butene elastomer in the polypropylene resin composition of the present invention, the difference in molding shrinkage in the flow direction and the vertical direction with respect to the thickness of the polypropylene resin may be minimized.

According to various embodiments, in the polypropylene composition according to the present invention, the ethylene-butene elastomer is included in an amount of about 10-20 parts by weight based on 100 parts by weight of the base resin. If the content of the ethylene-butene elastomer is less than 10 parts by weight, the difference in molding shrinkage in the flow direction and the vertical direction with respect to the thickness of the polypropylene resin may be hardly affected. In contrast, if the content exceeds 20 parts by weight, the difference in molding shrinkage may be improved, but impact strength, rigidity and scratch resistance may be unsatisfactory.

According to various embodiments, the polypropylene resin composition of the present invention further includes a slip agent for improving scratch resistance. Any known slip agents can suitably be used and, according to a preferred embodiment, the slip agent is a mixture of a siloxane-based compound and an amide-based compound.

According to a preferred embodiment, the slip agent includes an siloxane-based compound and an amide-based compound at a mixing ratio of about 1-9:9-1 (siloxane-based compound:amide-based compound).

According to various embodiments, the siloxane-based compound is polydimethylsiloxane having a weight-average molecular weight of about 200,000 or higher, more specifically about 250,000-600,000. In particular, the siloxane-based compound is used to create a slippery surface. When the resin composition including the siloxane-based compound is applied on the surface of, for example, an automotive interior part, the siloxane-based compound is released onto the surface and forms a coating film. The thus formed coating film improves slip property.

According to various embodiments, the amide-based compound is oleamide ($C_{18}H_{35}ON$). The amide-based compound is used to create a slippery surface and has a low molecular weight. When the resin composition including the amide-based compound is applied on the surface of, for example, an automotive interior part, the amide-based compound is released onto the surface and forms a coating film during or after the application onto the surface. The coating film also improves slip property by reducing a frictional coefficient of the surface.

According to various embodiments, in the polypropylene resin composition, the slip agent may be included in an amount of about 1-3 parts by weight, more specifically about 1-2 parts by weight, based on 100 parts by weight of the base resin. If the content of the slip agent is greater than this range, overall physical properties may be unsatisfactory and compatibility of the polypropylene with other components may decrease. Accordingly, the above range is recommended.

According to various embodiments, the slip agent is included in the polypropylene resin composition in the form of a master batch for better dispersion of the mixture of the siloxane-based compound and the amide-based compound. According to various embodiments, calcined silica may be used as a carrier resin for preparing the masterbatch.

The polypropylene resin composition of the present invention may further include about 2-5 parts by weight of modified polypropylene, based on 100 parts by weight of the base polypropylene resin, with about 1-2 mol % of polar groups thereof being graft-polymerized. If the content of the modified polypropylene is less than 2 parts by weight, improvement of rigidity may be insufficient. In contrast, if the content exceeds 5 parts by weight, impact property and fluidity may decrease because of increased rigidity.

The modified polypropylene improves compatibility and binding of the components of the polypropylene resin composition and thereby improves its physical properties. Specifically, binding of homopolypropylene with maleic anhydride and peroxide improves the binding between polypropylene and the inorganic filler because of the presence of the amine-based polar groups.

The polypropylene resin composition of the present invention including the above-described components exhibits no cracking even when exposed to aromatic compounds and various chemicals because of its superior chemical resistance. The polypropylene resin composition is further easy to process and can be applied for various uses because of its excellent mechanical properties, such as impact strength, rigidity, etc.

Also, the polypropylene resin composition of the present invention exhibits a reduced molding shrinkage in addition to the improved impact strength, rigidity and scratch resistance.

The present invention also provides an automotive interior part including the polypropylene resin composition of the present invention.

The polypropylene resin composition according to the present invention is particularly useful for automotive interior parts including, for example, cup holders, door garnishes, air vents, front trays, LC trays, console parts, glass fascia, knobs, etc.

EXAMPLES

The present invention will be described in more detail through examples. The following examples are for illustrative purposes only and it will be apparent to those skilled in the art not that the scope of this invention is not limited by the examples.

Preparation Example

The components described in Table 1 were mixed, and the resulting mixture was dry-blended, extruded using a twin extruder (diameter ø45 mm, SM) set at 200° C. to prepare a resin composition in pellet form. The composition in pellet form was injection-molded into a sample for physical property measurement, an embossed sample and a 350×100×3 mm sheet sample using an injection molding machine (clamping force: 140 ton, LG) set at 210° C.

evaluated for the samples for physical property measurements and the sheet samples of Examples 1-6 and Comparative Examples 1-12, as described below.

To be used as automotive interior trim materials, the above properties should satisfy the prescribed standards. If any of the properties fail to satisfy the standard, a problem may occur after molding and the corresponding product cannot be used for automotive interior parts.

1) Specific Gravity

A sample according to ASTM D790 was cut into a test sample for specific gravity measurement, and specific gravity was measured according to ASTM D792. Density Meter (measurement range: 200 g/0.0001 g, Mirage) was used for the measurement.

2) Tensile Strength

Tensile strength was measured according to ASTM D638. Crosshead speed was 50 mm/min. A universal testing machine (UTM, Instron) was used for the measurement.

3) Flexural Modulus

Flexural modulus was measured according to ASTM D790. Crosshead speed was 10 mm/min. A UTM (Instron) was used for the measurement.

4) Impact Strength

Impact strength was measured according to ASTM D256 at room temperature (23° C.). An impact tester (Yasuda) was used for the measurement.

5) Scratch Resistance

After conducting experiments using a sapphire scratch tester as shown in FIG. 1 under the condition described in Table 2, a surface state was evaluated according to the standards described in Table 3.

TABLE 1

| | | High-Crystalline PP | EOR | EBR | Glass fiber | Needle-Shaped whisker | Talc in Plate form | Slip agent | Modified MA-g-PP | Colorant & other additives | ABS |
|---|---|---|---|---|---|---|---|---|---|---|---|
| Example | 1 | 60.8 | — | 15 | 10 | — | 5 | 1 | 3 | 5.2 | |
| | 2 | 55.8 | — | 15 | 15 | — | 5 | 1 | 3 | 5.2 | |
| | 3 | 50.8 | — | 15 | 20 | — | 5 | 1 | 3 | 5.2 | |
| | 4 | 55.8 | — | 10 | 20 | — | 5 | 1 | 3 | 5.2 | |
| | 5 | 44.8 | — | 20 | 20 | — | 5 | 2 | 3 | 5.2 | |
| | 6 | 49.8 | — | 15 | 15 | — | 10 | 2 | 3 | 5.2 | |
| Comparative Example | 1 | — | — | — | — | — | — | — | — | — | 100 |
| | 2 | 71.8 | — | — | — | — | 20 | — | 3 | 5.2 | |
| | 3 | 71.8 | — | — | 20 | — | — | — | 3 | 5.2 | |
| | 4 | 56.8 | — | 15 | 20 | — | — | — | 3 | 5.2 | |
| | 5 | 56.8 | — | 15 | 15 | 15 | — | — | 3 | 5.2 | |
| | 6 | 56.8 | — | 15 | 15 | — | 5 | — | 3 | 5.2 | |
| | 7 | 56.8 | 15 | — | 15 | — | 5 | — | 3 | 5.2 | |
| | 8 | 55.8 | 15 | — | 15 | — | 5 | 1 | 3 | 5.2 | |
| | 9 | 50.8 | — | 15 | 5 | — | 20 | 1 | 3 | 5.2 | |
| | 10 | 50.8 | — | 15 | 25 | — | — | 1 | 3 | 5.2 | |
| | 11 | 50.8 | | 5 | 20 | — | 5 | 1 | 3 | 5.2 | |
| | 12 | 39.8 | | 25 | 20 | — | 5 | 1 | 3 | 5.2 | |
| | 13 | 39.8 | | 20 | 20 | — | 10 | 2 | 3 | 5.2 | |

In Table 1, PP represents polypropylene, EOR represents ethylene-octene rubber, EBR represents ethylene-butene elastomer, and ABS represents acrylonitrile-butadiene-styrene copolymer resin.

Test Example

Specific gravity, tensile strength, flexural modulus, impact strength, molding shrinkage and scratch resistance were

TABLE 2

| Condition | |
|---|---|
| Specific gravity (Kgf) | 0.5 (including the weight of scratch tester) |
| Stroke (mm) | 100 ± 5 |
| Scratching speed | 100 |
| Scratch tester | FIG. 1 |
| Number of scratches | 1 |

TABLE 3

| Grade | Scratch width (μm) | Appearance |
|---|---|---|
| | Evaluation standard | |
| 5 | <20 | Little surface damage |
| 4 | 100-200 | No distinct surface damage |
| 3 | 200-300 | Slight surface damage |
| 2 | 300-400 | Whitening occurs due to distinct surface damage |
| 1 | >400 | Very severe surface damage |

6) Molding Shrinkage

Molding shrinkage was measured according to ASTM D955. A vernier caliper detectable up to 0.01 mm was used for the measurement.

7) Chemical Resistance

The test sample was wiped 3 times with cloths, each individually soaked with grease, wax for interior parts (HMC genuine-grade or equivalent thereto), sunscreen, alcohol and aromatic compounds, and kept for 1 hour in a test room at 23±2° C. and 50±5% RH (RH=relative humidity). After a first evaluation, the sample was kept in a constant-temperature bath at 70° C. for 3 hours and then a second evaluation was conducted.

8) Appearance

Appearance was visually evaluated under sunlight. There should be no surface scratches, blemishes, charring, bending, silver streaks, cracks, colored stains, distinct flow marks, weld lines, sink marks or other defects.

The results of evaluating the specific gravity, tensile strength, flexural modulus, impact strength, molding shrinkage, scratch resistance, chemical resistance and appearance are shown in Table 4.

TABLE 4

| | | Specific gravity — | Tensile strength Kgf/cm² | Flexural modulus Kgf/cm² | Impact strength Kgf cm/cm | Scratch resistance Grade | Molding shrinkage (/1,000) | | | | Chemical resistance | Appearance | Pass/fail |
|---|---|---|---|---|---|---|---|---|---|---|---|---|---|
| | | | | | | | Flow direction (MD) | Vertical direction (TD) | Deflection (TD/MD) | Average | | | |
| Requirement | | 1.06 | 400↑ | 25,000↑ | 9↑ | 3↑ | — | — | — | 3~4 | No abnormality | No whitening | — |
| Ex | 1 | 0.99 | 400 | 27,536 | 9 | 3.3 | 2.0 | 5.1 | 2.6 | 3.6 | No abnormality | No abnormality | Pass |
| | 2 | 1.03 | 447 | 30,370 | 11 | 3.2 | 1.8 | 4.6 | 2.6 | 3.2 | No abnormality | No abnormality | Pass |
| | 3 | 1.05 | 512 | 31,840 | 12.9 | 3.2 | 1.7 | 4.5 | 2.6 | 3.1 | No abnormality | No abnormality | Pass |
| | 4 | 1.05 | 520 | 32,410 | 11 | 3.2 | 1.8 | 4.7 | 2.6 | 3.3 | No abnormality | No abnormality | Pass |
| | 5 | 1.05 | 480 | 30,010 | 14.2 | 3.3 | 1.7 | 4.3 | 2.5 | 3.0 | No abnormality | No abnormality | Pass |
| | 6 | 1.05 | 409 | 31,584 | 9.6 | 3.0 | 1.8 | 4.5 | 2.5 | 3.2 | No abnormality | No abnormality | Pass |
| Com. Ex | 1 | 1.06 | 481 | 24,676 | 11 | 3.5 | 3.0 | 3.5 | 1.2 | 3.3 | Crack occurred | No abnormality | Fail |
| | 2 | 1.04 | 350 | 28,996 | 3.3 | 2 | 9.0 | 14.0 | 1.6 | 11.5 | No abnormality | No abnormality | Fail |
| | 3 | 1.04 | 510 | 31,820 | 11 | 2.7 | 1.8 | 11.0 | 6.1 | 6.4 | No abnormality | No abnormality | Fail |
| | 4 | 1.04 | 500 | 30,753 | 14 | 2.8 | 1.7 | 9.0 | 5.3 | 5.4 | No abnormality | No abnormality | Fail |
| | 5 | 1.03 | 450 | 32,420 | 8 | 2.8 | 1.4 | 8.7 | 6.2 | 5.1 | No abnormality | No abnormality | Fail |
| | 6 | 1.03 | 425 | 32,370 | 9 | 2.8 | 1.4 | 5.2 | 3.7 | 3.3 | No abnormality | No abnormality | Fail |
| | 7 | 1.03 | 432 | 32,303 | 9.3 | 2.8 | 1.6 | 7.6 | 4.8 | 4.6 | No abnormality | No abnormality | Fail |
| | 8 | 1.03 | 430 | 32,060 | 9.2 | 3 | 1.6 | 8.0 | 5.0 | 4.8 | No abnormality | No abnormality | Fail |
| | 9 | 1.04 | 340 | 23,650 | 16 | 2.5 | 5.2 | 10.2 | 2.0 | 7.7 | No abnormality | No abnormality | Fail |
| | 10 | 1.06 | 525 | 32,050 | 13.1 | 3.3 | 1.4 | 4.3 | 3.0 | 2.9 | No abnormality | Whitening occurred | Fail |
| | 11 | 1.05 | 520 | 33,590 | 8.5 | 3.2 | 2.1 | 5.1 | 2.4 | 3.6 | No abnormality | No abnormality | Fail |
| | 12 | 1.05 | 480 | 27,010 | 16.8 | 2.5 | 1.5 | 3.7 | 2.5 | 2.6 | No abnormality | No abnormality | Fail |
| | 13 | 1.07 | 470 | 31,654 | 12.3 | 2.8 | 1.6 | 4.0 | 2.5 | 2.8 | No abnormality | Whitening occurred | Fail |

As shown in Table 4, the polypropylene resin compositions of Examples 1-6 satisfied all the requirements of specific gravity, rigidity, impact resistance and molding shrinkage.

Comparative Example 1, which used conventional ABS resin, exhibited superior mechanical properties and shrinkage, but chemical resistance was unsatisfactory. Comparative Example 2, which used only talc, satisfied none of the mechanical properties, scratch resistance or molding shrinkage.

Comparative Examples 3 and 4, which used only glass fiber, demonstrated satisfactory mechanical properties, but shrinkage and scratch resistance were unsatisfactory.

Comparative Example 5, which used glass fiber, EBR and whisker, demonstrated unsatisfactory impact strength, scratch resistance and molding shrinkage.

Comparative Example 6, which used no slip agent, demonstrated unsatisfactory scratch resistance.

Comparative Example 7, which used EOR, did not satisfy the requirements of scratch resistance and molding shrinkage.

Comparative Example 8, which used EOR and added a slip agent, demonstrated unsatisfactory shrinkage.

Comparative Example 9, wherein the glass fiber content was decreased by 10%, demonstrated unsatisfactory tensile strength, flexural modulus, scratch resistance and dimensional stability.

Comparative Example 10, wherein the glass fiber content was increased by 20%, demonstrated increased specific gravity and unsatisfactory appearance due to exposure of the glass fiber on the surface.

Comparative Example 11, wherein the EBR content was decreased, demonstrated unsatisfactory impact strength.

Comparative Example 12, wherein the EBR content was increased, demonstrated unsatisfactory scratch resistance. Also, the shrinkage was too low to use the same mold as that for the ABS resin.

Comparative Example 13, wherein 20% of glass fiber and 10% of talc were used, demonstrated unsatisfactory specific gravity and scratch resistance owing to the excessive use of the inorganic materials. Also, whitening was observed.

The polypropylene resin composition according to the present invention demonstrates superior mechanical properties, and can be suitably used for various electric/electronic devices, household electric appliances, indoor goods, automotive interior parts, and the like.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A polypropylene resin composition having superior mechanical properties, comprising:
   about 44.8-55.8 parts by weight of a polypropylene having a melt index of about 10-60 g/10 min at 230° C.;
   about 10-20 parts by weight of glass fiber;
   about 2-10 parts by weight of talc;
   about 10-20 parts by weight of an ethylene-butene elastomer;
   about 1-3 parts by weight of a mixture of a siloxane-based compound and an amide-based compound; and
   modified polypropylene with about 1-2 mol % of polar groups thereof being graft-polymerized,
   wherein the parts by weight are relative to 100 parts by weight of the polypropylene resin composition.

2. The polypropylene resin composition according to claim 1, wherein the glass fiber has an average fiber length of about 3-10 mm and an average diameter of about 4-20 μm.

3. The polypropylene resin composition according to claim 1, wherein the talc is in plate form and has an average particle size of about 2-10 μm.

4. The polypropylene resin composition according to claim 1, wherein the siloxane-based compound and the amide-based compound are a mixture of the siloxane-based compound and the amide-based compound at a ratio of about 1-9:9-1.

5. An automotive interior part comprising the polypropylene resin composition according to claim 1.

* * * * *